Nov. 19, 1940.   L. J. LARSON   2,222,079
METHOD OF TESTING VESSEL LINERS
Filed Jan. 9, 1939
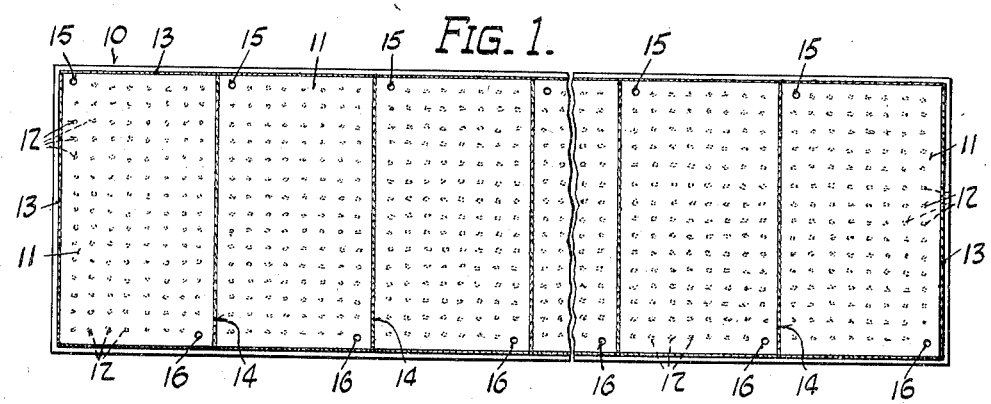
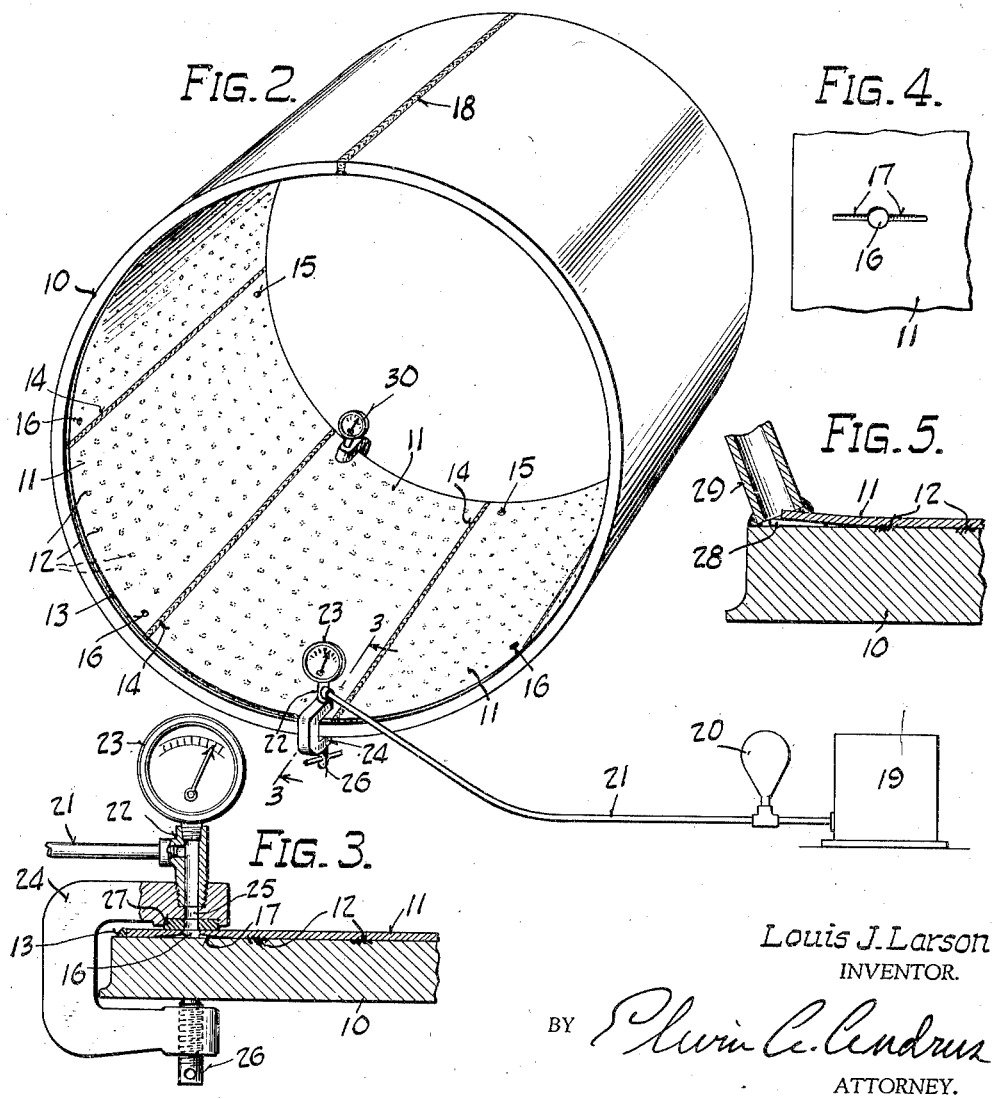
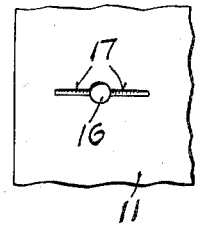
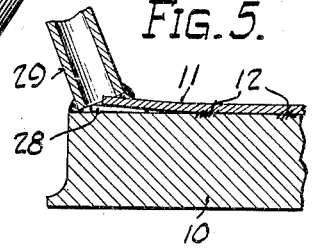
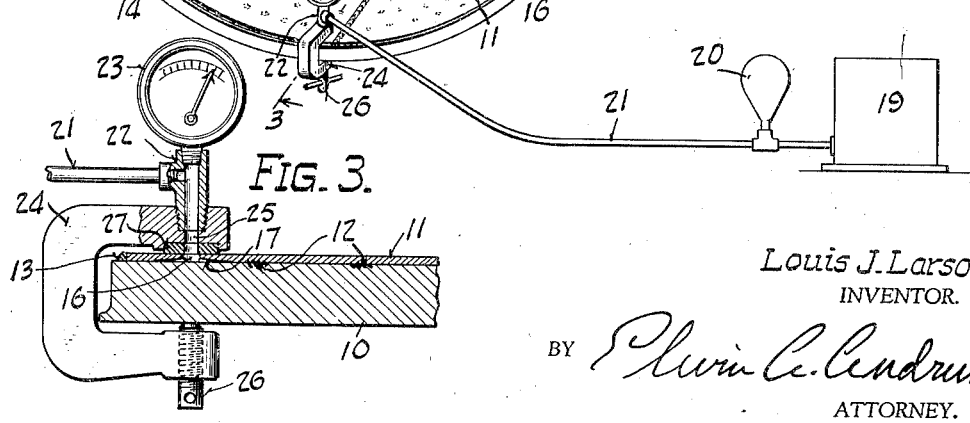
Louis J. Larson
INVENTOR.
BY
ATTORNEY.

Patented Nov. 19, 1940

2,222,079

UNITED STATES PATENT OFFICE 2,222,079

METHOD OF TESTING VESSEL LINERS

Louis J. Larson, Whitefish Bay, Wis., assignor to A. O. Smith Corporation, Milwaukee, Wis., a corporation of New York Application January 9, 1939, Serial No. 249,903

2 Claims. (Cl. 73—51)

The present invention relates to a method of testing metallic liners for vessels to determine the effectiveness of the bonding of the liners to the vessel walls.

An object of the present invention is to provide a method of testing metallic liners of pressure vessels and the like to determine the perfection of the bond between the liner and the wall of the vessel.

A further object of the invention is to provide a method whereby pressure may be introduced between a liner and the vessel wall to which it is attached to test the bond therebetween without injury to the wall or liner.

A still further object is to test and repair if necessary the bond between alloy liners and mild steel or other vessel walls by a process that is effective and economical.

Other objects will be apparent from the following description and claims. The invention will be best understood by referring to the accompanying drawing in which:

Figure 1 is a plan view of a plate with attached liner upon which testing is to be done;

Fig. 2 is a perspective view of a lined vessel ring-section upon which testing is being done;

Fig. 3 is a section at 3—3 of Fig. 2 showing a method of applying pressure under the liner;

Fig. 4 is a plan view of the under side of a position of the liner containing a pressure supply hole; and Fig. 5 is a view similar to Fig. 3 of a modified form of supplying pressure under the liner.

The present invention is particularly adapted for use with lined structures of the type described in Patent No. 1,680,276 issued on August 14, 1928 to Orrin E. Andrus and Sune Hermanson, and in which the attachment between the liner sheet and shell plate is made at close and contiguous points but does not occupy the entire area between the sheet and plate.

Plate 10 is a plate from which a pressure vessel ring-section is to be made. Sheets 11 of corrosion resistant alloy liner material have been laid on plate 10 and resistance welded to it at closely adjacent points 12. Sheets 11 are then seal welded, preferably by means of metallic arc welding, around their edges 13 and along their intermediate edges 14. Before resistance welding sheets 11 to plate 10, holes 15 and 16 are made in each sheet, preferably in the extreme opposite corners of the sheet. These holes are later employed to introduce pressure behind the liner sheet. To facilitate the entrance and exit of the pressure medium between the sheet and plate tapered grooves 17 (Figs. 3 and 4) radiating from each hole are cut into the underside of the sheet before it is applied to the plate.

After plate 10 has been covered as above described with liner sheets 11 and the sheets seal welded to the plate around their edges by welds 13 and 14 the composite plate is usually heated in a furnace to a suitable temperature and then rolled into a ring. The meeting edges of the plate are then joined by a weld 18 (Fig. 2).

In the affixing of the protecting liner sheet to the plate by the preferred method of electric resistance welding integrally fused bonding is secured at the welds and tight contact of the sheet and plate obtained. It has, however, been discovered that by providing for the introduction of a fluid pressure medium such as water or air under the liner at one point and steadily maintaining a suitable pressure thereon that an elastic springing of the sheet between attachments can be effected permitting such fluid to gradually move out to the extremities of the sheet subjecting all attaching bonds thereof to a satisfactory force and thus definitely establishing the effectiveness of each bond between the liner sheet and the plate.

It has been found most advantageous to test each sheet after the vessel ring has been formed from the lined plate as illustrated in Fig. 2, although it is possible to test it in the flat. When water is employed as the pressure medium, a small hydraulic hand pump 19 can be satisfactorily employed to produce the pressure. When such a pump is used, however, it is best to use an air chamber 20 to absorb the fluctuations and insure a steady constant pressure. In applying the pressure a connecting tube 21 leads from the air chamber 20 to the sheet in the ring or plate assembly. Tube 21 connects through T connection 22 to pressure gauge 23. In applying the pressure to sheet 11 through opening 16, clamp 24 is placed over the edge of the sheet and plate with an opening 25 aligned with hole 16 and then tightened by means of screw 26 to compress gasket 27 and seal the connection between the pressure system and the liner sheet. The T 22 is secured to clamp 24 and has its lower opening registering with the opening 25. Pressure is then gradually applied and the fluid is readily introduced under the liner through grooves 17.

Other means of introducing the pressure medium between the sheet and plate may be employed such as a wedge 28 forced beneath the edge of the liner as shown in Fig. 5. Any suitable means may also be employed for attaching the pressure supply system to the liner, for instance a pipe nipple 29 may be welded to the liner sheet to cover the opening 16 or welded to the plate and liner, when the wedge 28 is used, to cover the opening at the edge of the liner caused by the wedge. The supply pipe and gauge are attached to the nipple in this case. After the test is completed the nipple is burned off, the wedge removed in the latter case and the hole or edge sealed by a suitable weld.

The pressure under the liner electrically springs it between attachments as heretofore described thus gradually subjecting the entire sheet to a test of the bond for each attachment. The seal produced by welds 13 and 14 around each sheet confines the fluid and preserves the pressure. A pressure gauge 30 is preferably clamped over the hole 15 in the furthest corner of the sheet in a manner similar to the gauge and clamp at the inlet 16 except that no pump connecting piping is needed. When the pressure reading of gauge 30 has risen to substantially that of gauge 23 it is clear that the testing pressure has been properly distributed beneath the liner sheet. Instead of employing pressure gauge 30 the hole 15 may be left open until pressure fluid appears to come out of it, at which time the hole 15 may be closed by welding or a suitable valve and the pressure maintained on the fluid at the inlet for a predetermined time.

Any weld of unsatisfactory bond strength made between the sheet and plate will become detached during the test and will be made apparent by arching of the sheet in the area where the failure occurred due to the increased span between remaining bonds. The pressure is released after the inspection is completed and the fluid allowed to escape. In case any area of broken attachment is found the sheet is here flattened down with a hammer or other suitable means, a hole or holes drilled through the sheet and supplementary bond made preferably by means of welding through the holes, with metallic arc welding. The alloy employed in this welding is usually similar to that of the sheet, or like the alloy deposited when making the intermediate welds between the sheets as at 14. After the supplementary bond is made a repetition of the inspection test can be applied if desired. If desired a pressure inlet only may be employed but in this case there will be no indication of whether the pressure medium has reached the far side of the sheet. Several inlet and indicating openings may be provided in each sheet or an inlet opening may be provided in one sheet and an indicating opening in the adjacent sheet with a communicating passage between the sheets.

The clamp shown in Figs. 2 and 3 is suitable for use on rings or plates of an incomplete vessel. However, it may be desirable to test the welded bonds of the lining of a completed vessel in which case the edge clamps cannot be employed but clamps held to the openings by struts braced against the opposite wall of the vessel may be employed or nipples similar to nipples 29 may be welded to the openings.

In the making of a lined ring, after weld 18 has been made, it is usually necessary to reroll the ring to obtain the desired true roundness. Heating of the ring for rerolling is usual. In the practice of the present invention holes 15 and 16 are preferably left open until after this heating and rerolling. In case water has been employed as the pressure medium and any still remains behind the liner steam is formed and forces its way out through holes 15 and 16. Following this rolling and cooling the holes 15 and 16 are closed by welding and a tight, perfectly bonded liner attached to the vessel wall is secured. Subsequent examinations have shown that the liner sheet between bonds or attachments lies tightly against the plate surface thus demonstrating conclusively that the movement of the sheet to permit the distribution of pressure fluid was elastic as distinguished from permanent deformation.

As an example of practical values which have been employed with the above results, a stainless steel sheet of 5/64" thickness has been attached to a heavy carbon steel vessel plate by spots spaced on 1½" centers and tested with a final fluid pressure of 1500 lbs. per square inch. With heavier sheets or closer spacing correspondingly higher final test pressures may be employed and remain within the elastic characteristics of the sheet. Satisfactory test characteristics can generally be had with attachment spacings as great as 2" and in some cases with even greater spacings.

The testing and supplementing of the attachment bonds has been described as being performed on the sheets in the ring sections just prior to heating for re-rolling. In case the liner material is air hardening, as is usually the case with the straight chrome steels, this heating provides an opportunity to remove any brittleness that may have been produced in the event welding upon the sheet was necessary. The testing can also be readily done on the flat sheet before rolling and the heat applied for rolling is also an effective heat treating agent.

The invention is not only applicable to determine any undue weakness of bond in the spot welds, but it also is applicable to disclose any possible leaks in the liner material due to any cause whatsoever. In this way all defects are located and can be readily remedied.

I claim:

1. In the manufacture of lined pressure vessels by the intermittent attachment of a protective liner sheet to the vessel plate the method of testing the bond strength of a tight fitting sheet and plate comprising, providing the sheet to be tested with a pair of widely separated openings from the sheet side for the passage of pressure fluid to the area between the sheet and plate, sealing the edges of the attached sheet to the plate to preserve testing fluid pressure, introducing fluid under pressure through one of the openings, providing a pressure indicating device in register with the other separated opening through the sheet, raising the pressure on the test fluid until the liner sheet between attachments elastically deflects to effect the gradual passage of the test fluid through the unbonded area between the sheet and plate, and maintaining such pressure until the indicator at the opening widely removed from the inlet indicates a predetermined test pressure between the sheet and plate.

2. In the manufacture of lined pressure vessels in which interconnecting unbonded areas exist between the liner sheet and the vessel wall and are uniformly distributed throughout the vessel wall, the method of testing the bond between the liner and vessel wall and of testing the liner for leakage, comprising introducing fluid under pressure to said intercommunicating areas between the liner and the vessel wall, and determining the fluid pressure at a point between the liner and vessel wall remote from the point of introduction of fluid pressure until the pressure at said remote point indicates the application of a predetermined test pressure to substantially all of the bonds between the liner and vessel wall.

LOUIS J. LARSON.

CERTIFICATE OF CORRECTION.

Patent No. 2,222,079. November 19, 1940.

LOUIS J. LARSON.

It is hereby certified that error appears in the printed specification of the above numbered patent requiring correction as follows: Page 2, first column, line 3, for the word "electrically" read --elastically--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.